INVENTOR.
Lewis W. Schmidt
by Webster & Webster
ATTORNEYS

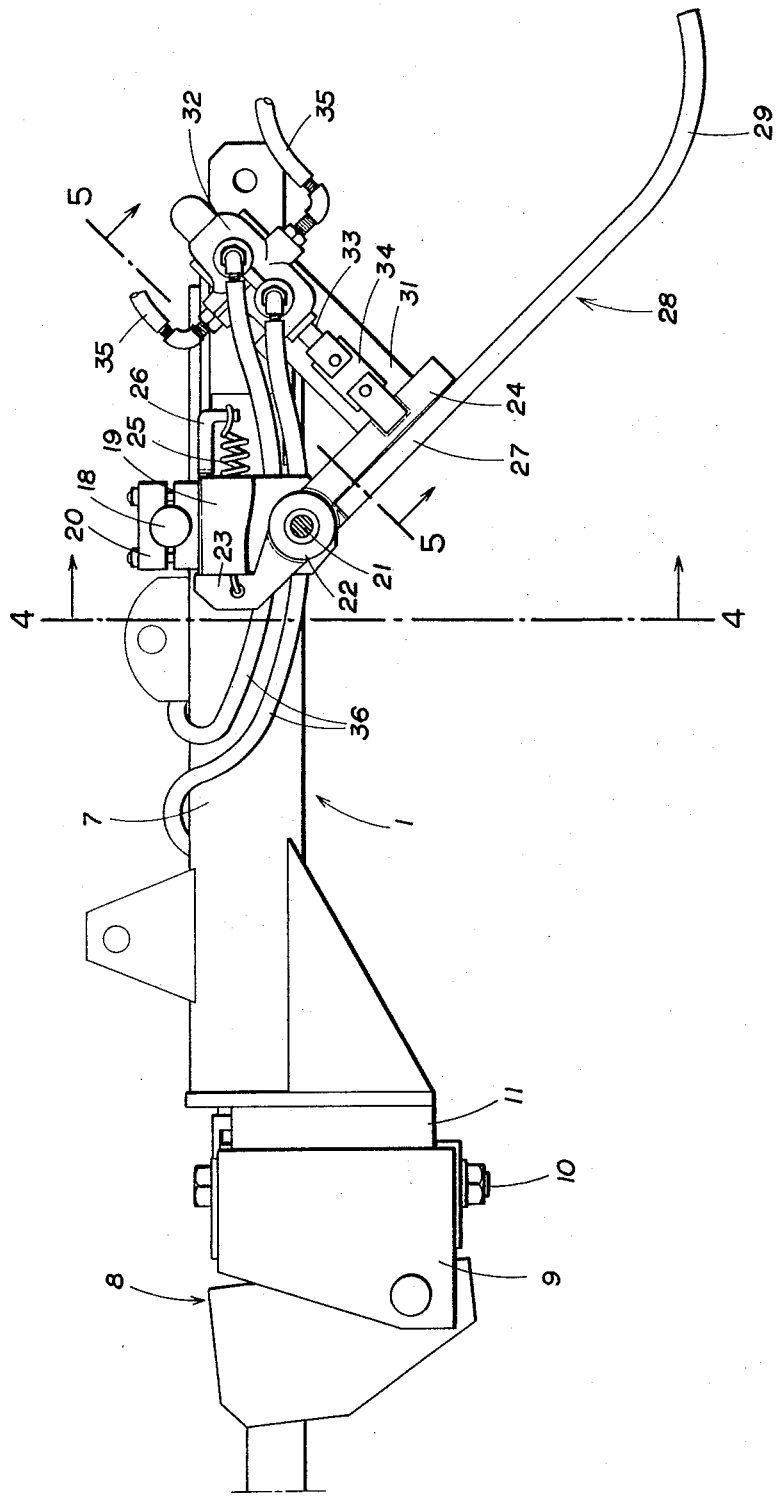

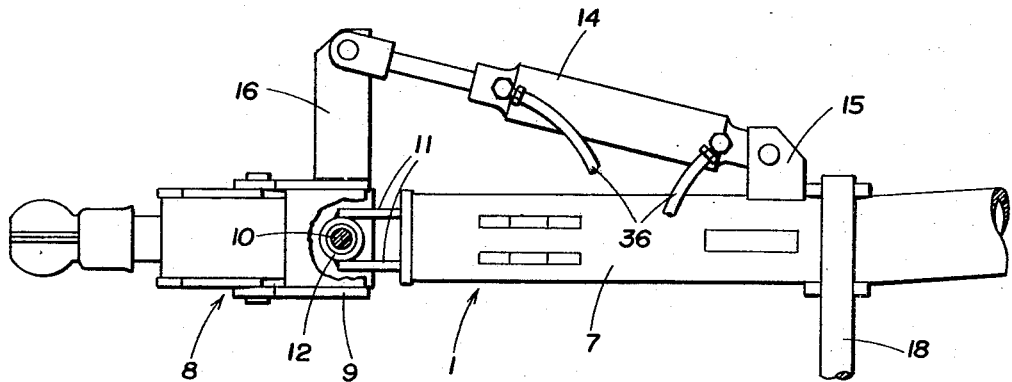
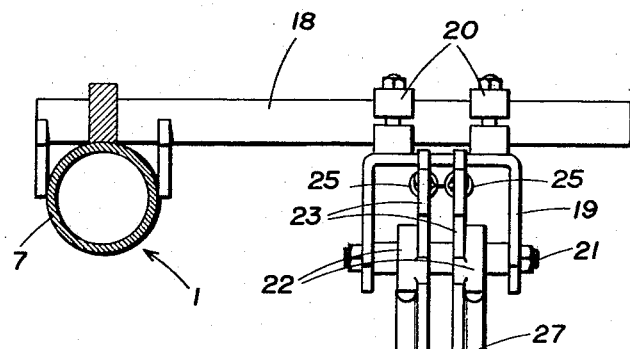
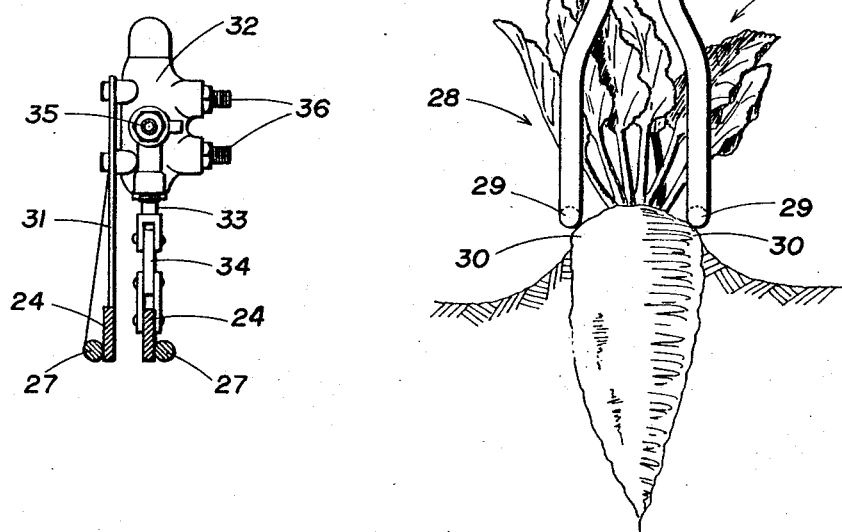

United States Patent Office 3,326,319
Patented June 20, 1967

3,326,319
AUTOMATIC STEERING DEVICE FOR ROW
CROP HARVESTERS
Lewis Wallace Schmidt, Rio Vista, Calif., assignor of
16% to Lloyd K. Schmidt, Isleton, Calif., 16% to
Albert M. Jongeneel, 10% to George C. Gordon, 10%
to Ernest F. Blackwelder, 16% to Lewis W. Schmidt,
all of Rio Vista, Calif., 16% to Claude A. Loucks,
Sonoma, Calif., 8% to Daniel P. Newell, San Francisco, Calif., 1⅓% to Pliny G. Holt, Washington, D.C.,
1⅓% to Frank H. Holt, Alexandria, Va., 1⅓% to
Richard E. Holt, Stockton, Calif., 1⅓% to Harriet H.
Shelton, Los Gatos, Calif., 1⅓% to Frank A. Guernsey
and 1⅓% to Darius A. Guernsey, both of Sherman
Oaks, Calif.
Filed Nov. 19, 1965, Ser. No. 508,801
5 Claims. (Cl. 180—79.2)

This invention relates in general to tractor drawn row crop harvesters.

In particular, the invention is directed to, and it is the major object to provide, an automatic steering device for a row crop harvester.

Another important object of the invention is to provide a steering device, for the purpose described, which includes an improved row sensing or finding mechanism, and a steering apparatus automatically response to said row sensing mechanism; the steering device thus being operative to maintain the harvester in proper position relative to the crop row as the harvester advances therealong.

An additional important object of this invention is to provide an automatic steering device, as above, constructed so that a very sensitive and accurate row sensing and harvester steering action will be obtained so that the operator of the tractor need not pay specific attention to the alinement of the harvester relative to the row as long as such operator holds the tractor generally centered over the row.

A further object of the invention is to provide an automatic steering device which is designed for ease and economy of manufacture, and convenience of installation on a harvester at the time of manufacture or subsequently as an attachment.

A still further object of the invention is to provide a practical, reliable, and durable automatic steering device and one which is exceedingly effective for the purpose for which it is designed.

These objects are accomplished by means of such structure and relative arrangement of parts as will fully appear by a perusal of the following specification and claims.

In the drawings:

FIG. 2 is an enlarged side elevation of the device as applied to the tongue unit; the latter being detached from the harvester and the view being taken on the side of said tongue unit opposite that shown in FIG. 1.

FIG. 3 is a top plan view of the forward portion of the tongue unit; the view showing the ram which—in response to the row sensing mechanism—imparts a horizontal knuckling action to said tongue unit.

FIG. 4 is an enlarged transverse section taken on line 4—4 of FIG. 2; the view showing the sensing fingers as engaged with a beet row.

FIG. 5 is a fragmentary cross section on line 5—5 of FIG. 2.

Figure 1:
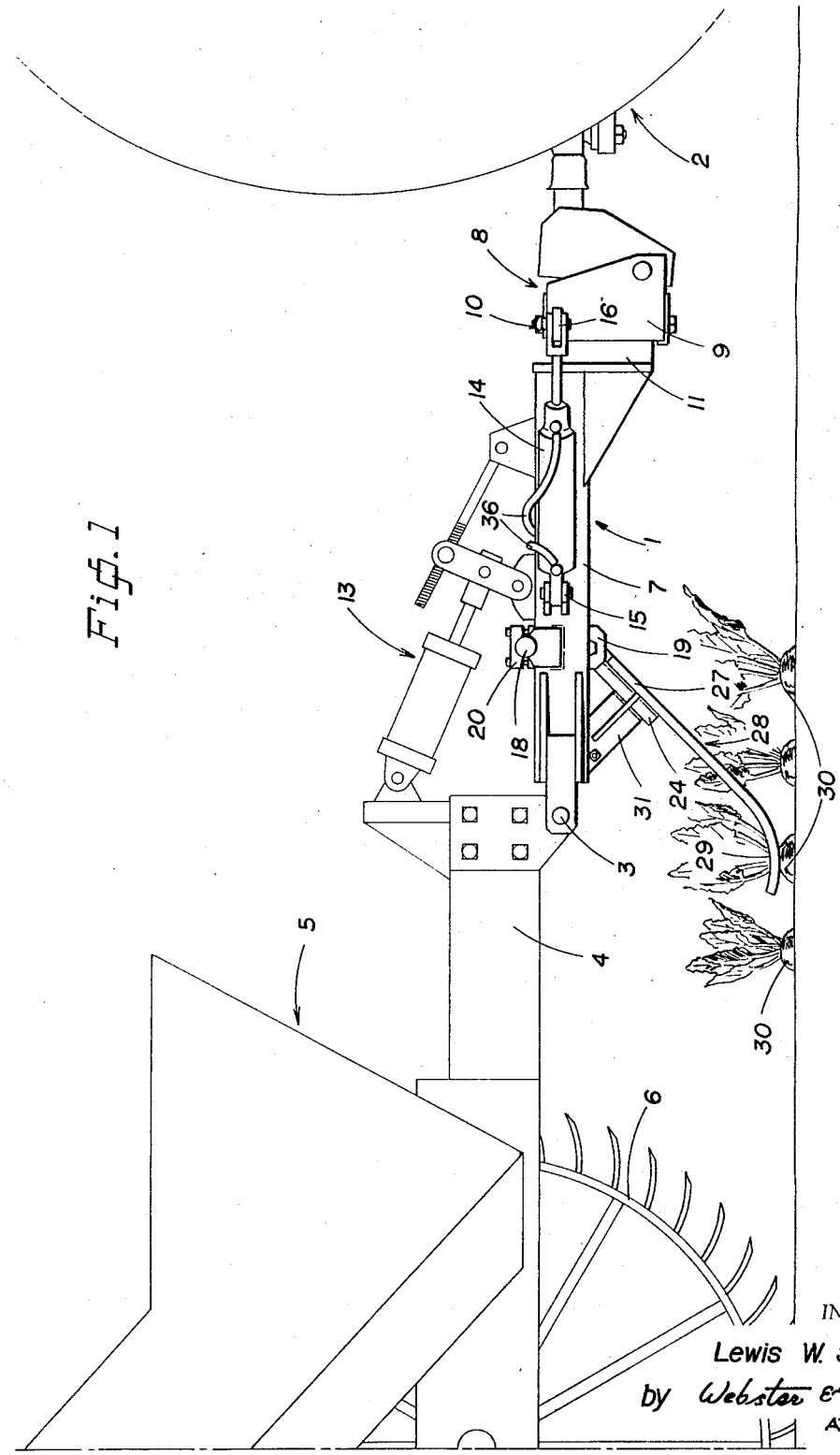
FIG. 1 is a side elevation of the improved automatic steering device as applied to the tongue unit of a sugar beet harvester; the view showing the sensing fingers as engaged with a beet row.

Referring now more particularly to the drawings and to the characters of reference marked thereon, the numeral 1 indicates generally a tongue unit which at its forward end is adapted for swivel connection in the usual manner to a tractor indicated generally at 2, and at its rear end said tongue unit is connected by a transverse pin 3 to the forward end of the draft frame 4 of a row crop harvester indicated at 5. In the present instance, the harvester is depicted as being a beet harvester which includes a spiked pick-up wheel 6 such as that shown in United States Patent No. 3,212,588; the tongue unit 1 being laterally offset somewhat from the longitudinal plane of said pick-up wheel.

The tongue unit 1 comprises an elongated rear and main portion 7 of rigid construction, and a short front portion 8 which includes a vertical box-like member 9 at and open to the rear; said member supporting a vertical pin 10 therein (see FIG. 3). The main portion 7 of the tongue unit 1 is formed at its forward end with a pair of transversely spaced ears 11 which project into the box-like member 9 in laterally clearance relation, and at their forward ends said ears rigidly support a sleeve 12 which embraces the pin 10 in turnable relation.

It will be noted that the tongue unit 1 is rigid with the harvester 5 as against lateral swivel movement, but can swing vertically about the pin 3 as an axis; such vertical swinging being, however, prevented by means of an adjustable hydraulic ram unit 13 which extends diagonally between the main tongue portion 7 and the harvester frame 4 some distance above the pin 3 as shown in FIG. 1. The tongue unit 1 and the ram unit 13 are substantially the same as shown in the aforementioned patent.

Lateral swinging of the main tongue portion 7 about pin 10 and relative to the short front portion 8, and which swinging effects the steering of the harvester relative to the tractor, is accomplished as follows:

Extending lengthwise of the tongue unit 1 on one side of the same and at an acute horizontal angle thereto, is a double acting hydraulic ram 14. At its rear end the ram 14 is swivelly connected to a bracket 15 rigid with the main tongue portion 7 intermediate its ends, and at its forward end such ram is swivelly connected to another bracket 16 rigid with and projecting from the member 9 of the front tongue portion 8. Extension and contraction of the ram 14—to angle the main tongue portion 7 horizontally in one direction or the other—is accomplished by the crop row sensing mechanism indicated generally at 17; such mechanism being mounted in connection with said main tongue portion 7 in longitudinal alinement with the pick-up wheel 6 of the harvester.

The sensing mechanism 17 (now to be described in detail) comprises a bar 18—preferably of circular form in section—which is rigidly supported from the main tongue portion 7 relatively close to its rear end and projecting laterally therefrom. An inverted U-shaped hanger 19 depends from the bar 18 and is mounted for both longitudinal and rotary adjustment thereon by suitable clamps 20. Supported by the hanger 19 is a transversely extending pin 21 which is parallel to said bar 18.

Independently turnable on said pin 21 in transversely spaced relation are hubs 22 from which short arms 23 project upwardly, while longer arms 24 project downwardly from said hubs. The arms 23 project forwardly from the hubs 22 and hanger 19 and are adapted at their upper ends to abut against the forward edge of the hanger at the top thereof. The arms 23 are normally held in contact with said hanger edge by tension springs 25 connected thereto and to a rearward extension 26 of the hanger; the longer arms 24 being then disposed at a rearward slope of substantially 45 degrees to the ground, as shown in FIGS. 1 and 2.

Secured lengthwise on and extending beyond the arms 24 on the laterally outer side thereof are the elongated shanks 27 of row crop sensing fingers 28 which at their lower end portions are curved in a rearward direction convex to the ground, as at 29. Such lower end portions 29 of the fingers 28 are disposed in such transversely spaced relation that when set at the proper level, they will successively bear in spring urged relation on the projecting crowns 30 of the row crop plants (such as sugar beets) being harvested, as the harvester is pulled along the row. The necessary level of the curved lower ends 29 of the fingers 28 relative to the crowns 30—so that said fingers pressingly engage the crowns and the springs 25 are under tension with the arms 23 held away from the hanger 19—is obtained by rotatably adjusting the mechanism 17 about the bar 18.

Rigid with and projecting upwardly from one arm 24 is a bracket plate 31, on the side of which that faces the other arm 24 a four-way valve 32 is secured. This valve 32 is—in the present embodiment—a "Gresen 4-Way Valve, 400 Series," being an open-spool relief valve set for a certain maximum pressure. The valve is mounted so that its spool or plunger 33 is disposed at a right angle to the related arm 24, and said plunger is connected at its lower projecting end to the other arm 24 by a suitable swivel link 34. The pressure supply and return conduits 35 to and from the valve extend to a conventional hydraulic pump unit (not shown) on the tractor. The alternate pressure feed and return conduits 36 lead from the valve 32 to the opposite ends of the ram 14.

In the operation of the device, the valve 32—as long as the sensing fingers 28 rest evenly on the crowns 30 of the row crop plants as shown in FIG. 4—will be maintained in its closed position, and the ram 14 will maintain the swivelly connected portions 7 and 8 of the tongue unit 1 in rigid longitudinal alinement.

However, when the harvester deviates laterally from the proper row-engaging position of the pick-up wheel 6, one or the other of the sensing fingers 28 is moved laterally from its initial crown-engaging position and drops off the crown, being urged downwardly by the action of the related spring 25. It is also possible that at the same time the other finger will be raised somewhat as it is moved across the crown.

In either case, part rotation of one or the other of the sensing fingers and the related mounting arm 24 about the pin 21 takes place. This produces a relative movement of the valve 32 and its plunger 33, opening the valve in one direction or the other to feed fluid to one end or the other of the ram 14. The ram 14 is consequently extended or contracted as the case may be, thus swinging the main tongue portion 7 laterally about the pivot pin 10 and hence automatically steering the harvester back to its proper position over the crop row. This in turn will restore the sensing fingers 28 to an even crown-engaging position, and the valve 32 will be again closed.

Whether the ram 14 is extended or contracted, and the resulting direction of swinging of the main tongue portion 7, depends on whether the valve plunger 33 is moved relatively up or down in the valve; the conduits 36 being connected to the valve so that the proper direction of swinging of said main tongue portion—according to the laterally shifted position of the sensing fingers—is assured.

Also, if desired the sensing fingers 28 may be arranged to ride on the top or sloping sides of the ridge in which a row crop is planted; the automatic steering action then resulting in the same manner as when such sensing fingers ride the crowns 30.

Due to the independent mounting of the sensing fingers 28, and the possible simultaneous movement of the valve 32 and plunger 33 in opposite directions, a very sensitive and fast-acting valve opening and closing movement is obtained, with a resultant sensitive and quick automatic steering action by the ram 14.

It is to be understood that the present invention may be used in connection with other types of harvesters, and other row crops, than those specifically shown and described herein.

From the foregoing description, it will be readily seen that there has been produced such an automatic steering device as substantially fulfills the objects of the invention, as set forth herein.

While this specification sets forth in detail the present and preferred construction of the automatic steering device, still in practice such deviations from such detail may be resorted to as do not form a departure from the spirit of the invention, as defined by the appended claims.

Having thus described the invention, the following is claimed as new and useful and upon which Letters Patent is desired.

I claim:

1. In a row crop harvesting apparatus which includes a tractor, a harvester rearwardly of the tractor, a tongue unit connecting the tractor and harvester, said tongue unit including a rear main portion rigid with the harvester and a forward portion pivotally connected to the rear portion for relative rotation about a vertical axis, and a fluid pressure ram connected in articulating relation to the tongue portions on one side thereof; a crop row sensing device mounted on the main tongue portion and comprising a pair of transversely spaced depending sensing fingers adapted at their lower ends for engagement with a crop row, means mounting the fingers for independent movement in a vertical plane, means acting on the fingers yieldably urging the same downwardly, and means controlled by the vertical movement of one finger relative to the other finger to feed fluid under pressure to one end or the other of the ram to extend or contract the same.

2. A device, as in claim 1, in which said last named means comprises a valve having a body mounted in connection with one finger and coupled to a source of pressure, conduits leading from the body to the opposite ends of the ram, and a movable valve member mounted in connection with the other finger; the valve being closed when the lower ends of the fingers are disposed at the same level.

3. A device, as in claim 1, in which the finger mounting means comprises a transversely extending pin fixed with said main tongue portion, a pair of hubs independently turnable on the pin, and arms rigid with the hubs and projecting downwardly and rearwardly at an acute angle to a horizontal plane; the fingers including longitudinal shanks extending lengthwise of and secured on the arms, and said controlled means being mounted on said arms.

4. In a row crop harvesting apparatus which includes a tractor, a harvester rearwardly of the tractor, a tongue unit connecting the tractor and harvester, said tongue unit including a rear main portion rigid with the harvester and a forward portion pivotally connected to the rear portion for relative rotation about a vertical axis, and a fluid pressure ram connected in articulating relation to the tongue portions on one side thereof; a crop row sensing device mounted on the main tongue portion adapted to actuate the ram to cause the latter to articulate the tongue unit so as to steer the harvester relative to the tractor; said sensing device comprising a bar secured on and projecting laterally from one side of said main tongue portion, a hanger below the bar, means supporting the hanger from the bar, a transverse horizontal pin supported by the hanger, a pair of transversely spaced hubs independently turnable on the pin, arms rigid with the hubs and projecting downwardly and rearwardly at an acute angle to a horizontal plane, a pair of transversely spaced sensing fingers each comprising an elongated shank and a convexly curved lower end portion adapted for engagement with a crop row, the upper portions of the shanks extending along and being secured to the arms, spring means acting on the arms yieldably urging the same downwardly, a four-way spool-type valve having a body and a plunger, the valve being connected to a source of fluid pressure and to the opposite ends of the ram, means mounting the valve body on one arm, and means mounting the plunger in connection with the other arm.

5. A device, as in claim 4, in which the bar is of circular form in section, and the hanger supporting means comprises a clamping unit rotatably adjustable on the bar.

References Cited

UNITED STATES PATENTS

| | | | |
|---|---|---|---|
| 2,484,069 | 10/1949 | Boncompain | 172—6 |
| 2,664,802 | 1/1954 | Myer | 172—6 |
| 3,208,535 | 9/1965 | Fischer | 172—6 |
| 3,249,366 | 5/1966 | Meyer | 180—79.2 |

BENJAMIN HERSH, *Primary Examiner.*

J. H. BRANNEN, *Assistant Examiner.*